United States Patent
Decker et al.

(10) Patent No.: US 8,769,398 B2
(45) Date of Patent: Jul. 1, 2014

(54) ANIMATION CONTROL METHODS AND SYSTEMS

(75) Inventors: Kevin Decker, San Jose, CA (US); Jing Jin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 987 days.

(21) Appl. No.: 12/698,979

(22) Filed: Feb. 2, 2010

(65) Prior Publication Data

US 2011/0191666 A1 Aug. 4, 2011

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)
G06T 13/00 (2011.01)

(52) U.S. Cl.
USPC .......................................... 715/234; 345/474

(58) Field of Classification Search
USPC .................. 715/234, 474; 345/474
See application file for complete search history.

(56) References Cited

U.S. PATENT DOCUMENTS

| | | | |
|---|---|---|---|
| 5,764,241 A | 6/1998 | Elliott et al. | |
| 6,487,588 B1 * | 11/2002 | Phillips et al. | 709/218 |
| 6,720,979 B1 * | 4/2004 | Shrader | 715/723 |
| 7,000,126 B2 * | 2/2006 | Stanley | 707/E17.121 |
| 8,010,816 B2 * | 8/2011 | Wong et al. | 715/205 |
| 2002/0040442 A1 | 4/2002 | Ishidera | |
| 2002/0073235 A1 * | 6/2002 | Chen et al. | 709/246 |
| 2002/0103822 A1 * | 8/2002 | Miller | 707/501.1 |
| 2008/0319862 A1 * | 12/2008 | Golan et al. | 705/14 |
| 2009/0119178 A1 * | 5/2009 | Janakiraman et al. | 705/14 |
| 2010/0123908 A1 * | 5/2010 | Denoue et al. | 358/1.6 |
| 2011/0302510 A1 * | 12/2011 | Harrison et al. | 715/760 |
| 2013/0167005 A1 * | 6/2013 | Corbett et al. | 715/234 |

* cited by examiner

Primary Examiner — Kyle Stork
Assistant Examiner — Nicholas Hasty
(74) Attorney, Agent, or Firm — Blakely, Sokoloff, Taylor & Zafman LLP (57) ABSTRACT

Animation control methods and systems. In one embodiment, a method to control animations includes receiving data representing content of a page (e.g. a web page), detecting, from the data, whether the page includes animated content, determining whether to halt execution of the detected animated content, and halting execution of the animated content if a determination to halt was made. In one implementation, the content can be configured into a document object model (DOM) and decisions to halt or not to halt can be made on a node-by-node basis within the DOM. In one implementation, the animated content can be allowed to execute for a shortened duration (e.g. in order to allow a user to see it) and then is halted.

15 Claims, 9 Drawing Sheets

ANIMATION CONTROL METHODS AND SYSTEMS

BACKGROUND OF THE INVENTION

The Internet, and especially the World Wide Web, has become a great vehicle to distribute information and to conduct commerce. Web pages can provide news, can allow a user to purchase goods and services, and can allow a user to exchange information, such as through web mail, etc. The tremendous use of web pages has encouraged designers and advertisers to use animation on the web pages to attract the attention of users. Animated advertisements can be found on many web pages. Even web pages that do not include advertisements often include animation, such as an animation created through a Flash plug-in or an animated GIF. These animations are often designed and configured to run continuously and indefinitely. In other words, these animations are often configured to run as long as the web page is open. In many cases, such animations can help to drain a device's battery (if the device is battery powered) and even if the device is not battery powered, these animations can unnecessarily increase the power consumption of the device. Furthermore, these animations can be annoying or distracting for a user.

SUMMARY OF THE DESCRIPTION

Systems and methods for controlling animated content, such as animated content within a web page, are described herein. In one embodiment, a method for controlling animation includes receiving data representing content of a page and detecting, from the data, whether the page includes animated content, and determining whether to halt execution of the animated content. The execution of the animated content can be halted in response to determining that the animated content should be stopped. The animated content can be allowed to be executed for a period of time and then it can be halted. This allows a user to determine whether the user is interested in the animated content and allows the user to relaunch the animated content by providing an input, such as a cursor positioning or a mouse hover or other inputs. In one embodiment, a conservative heuristic can be used to determine which animations to stop and which animations to allow to run without any restrictions. For example, if a page is full of Flash animations, it is likely to be a game, in which case the animations should not be stopped. If the animated content is a significant portion of the page and is centered on the page, then it is likely to be a video in which case the system will allow the animation to run normally according to one embodiment. By halting the execution of animated content which is considered by this method to be unnecessary, power consumption of the system can be reduced which is particularly beneficial if the system is powered by a battery. In one embodiment, the heuristic is a set of rules based in part upon a size of an area displaying the page and a size and a location of the animated content in the page. In one embodiment, the system may determine that one set of animations is to be stopped while another set of animations is allowed to execute normally. In one implementation, the system can capture and display an image of the animated content before execution of the animated content is halted, and this captured image can be displayed on the page (after halting execution of the animated content) in order to allow the user to indicate to the system, through an input, that the user desires to cause the execution of the animated content (e.g. by restarting or relaunching the animation).

In one embodiment, the system can be configured to allow the animated content to execute for a shortened duration after it is loaded and then it is halted so that the animation cannot run continuously or indefinitely. Hence, the animation is allowed to run for a shortened duration rather than the normal or full duration of the animation which may be continuous and indefinite as long as the page is open.

In another embodiment, a web browser performs an analysis of whether to restrict execution of portions of the web page on a portion-by-portion basis. In the case of a web page which is parsed into a form of a document object model (DOM), a web browser can determine, on a node-by-node basis, whether to restrict execution of each of the nodes. In one embodiment, the web page is represented by data having a hierarchical content that includes separate portions that each specify separate corresponding sections of the web pages; the web browser can analyze each of these separate portions to determine whether to restrict execution of each of the separate portions, such as restricting the execution of animation either immediately or after a period of time in which the animation executes. In the case of animations which are configured to execute continuously and indefinitely once rendered by a web browser, the halting of the execution of the animation can be determined based upon rules such as the size of an area displaying the page and the size and location of the particular portion being analyzed.

Systems which can perform these methods and machine readable storage media which can cause systems to perform these methods are also described herein.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
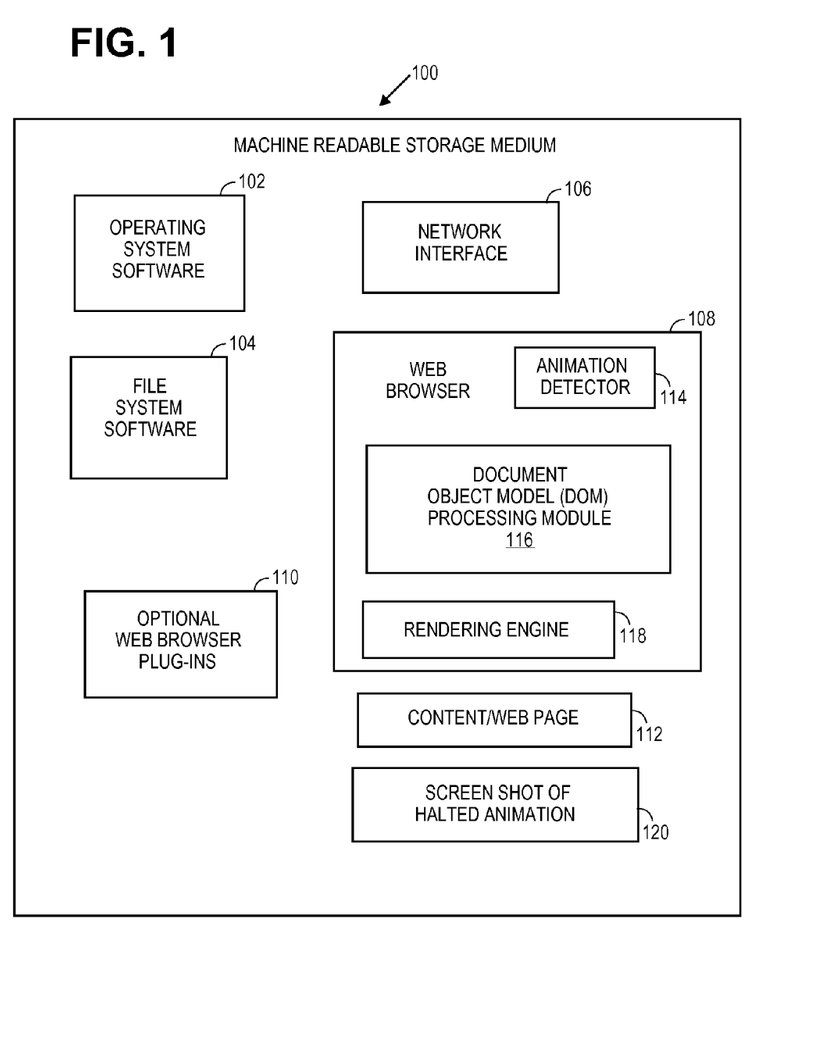
FIG. 1 shows an example of a machine readable storage medium which includes software for performing one or more of the methods described herein.

FIG. 1 shows an example of a machine readable storage medium containing one or more software components which can, at least in certain embodiments, perform any one of the embodiments of the methods described herein. The machine readable storage medium 100 may be in a single memory, such as flash memory, or dispersed across several memory devices, such as a hard drive, dynamic random access memory (DRAM), read-only memory, etc. The medium 100 can include operating system software 102 and file system software 104 which may be conventional operating system and file system software as is known in the art. Medium 100 can also include an optional web browser plug-in 110, such as a Flash plug-in, a QuickTime plug-in, or a PDF plug-in, etc. Medium 100 can also include network interface software 106 which can provide a TCP/IP software stack as is known in the art. In addition, the medium 100 can include a web browser 108 which processes the content of a web page as described herein. The medium 100 can also include a screen shot of a halted animation 120, which screen shot is described further below; for example, the screen shot is described further in connection with operation 423 of FIG. 4. Web browser 108 can include a document object model (DOM) module 116 which processes the content of the web page to derive a DOM of the web page as is known in the art. Web browser 108 also includes an animation detector 114 which can be used as described herein to detect animation within a web page or within another type of page such as a word processing page, etc. Web browser 108 can also include a conventional rendering engine 118 which may also be referred to as a layout engine, and this engine can be a conventional rendering engine or layout engine as is known in the art. It will be appreciated that, in some embodiments, methods described herein may be implemented in a combination of hardware and software and that components of the software shown in FIG. 1 may be replaced by hardware accelerators or may be replaced entirely by hardware or firmware. For example, the animation detector and other components of web browser 108 may be replaced by hardware configured to perform the operations of a web browser as described herein.

Figure 2:
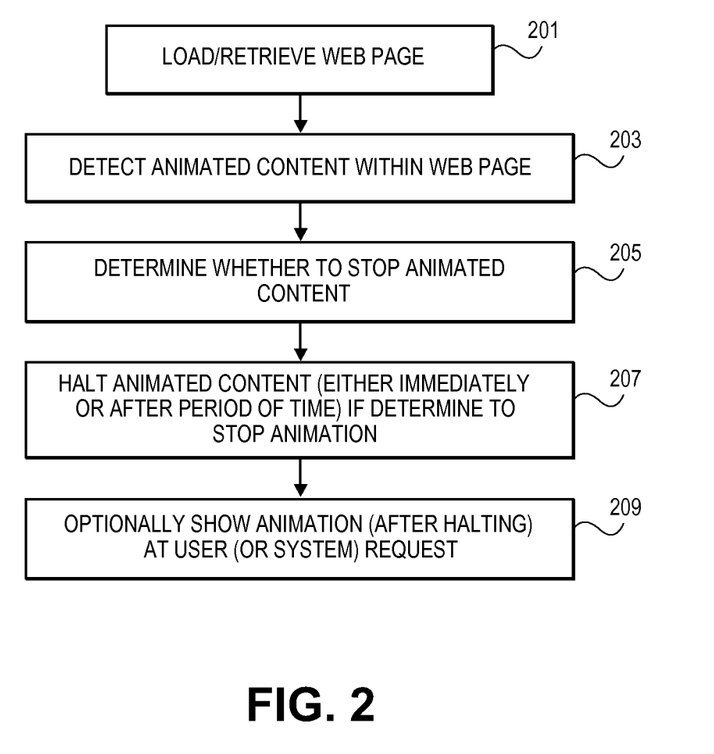
FIG. 2 is a flowchart which depicts an embodiment of a method described herein.

FIG. 2 shows an example of a method according to one embodiment of the present invention. This embodiment may be performed by the web browser 108 which is executing on a data processing system, such as the system shown in FIG. 9 or alternative data processing systems which include a processor and memory. The data processing system shown in FIG. 9 may include machine readable storage medium 100, for example. In operation 201, a data processing system loads or retrieves a web page or other type of page. In operation 203, the method detects whether there is animated content within the web page or other type of page. In one embodiment, document object model processing module 116 can detect the animated content as the DOM processing module parses the HTML of a web page. Flash content (which is processed by a Flash plug-in) can be considered animated content and an animated GIF content can also be considered animated content. Other animated content includes movie formats that can be processed or presented by a QuickTime plug-in, etc. Operation 203 typically detects and identifies animated content within the web page, and then the method determines, in operation 205, whether to stop any of the animated content. In one embodiment, the determination of whether to stop animated content is done by using a set of rules or heuristics which specify how to make a determination of whether or not to stop a particular animated content. An example of a set of rules to perform this operation is described herein including, for example, in the description of FIGS. 3A, 3B, 3C, and 3D. If the method determines, in operation 205, that one or more animated content on the web page is to be stopped, then in operation 207, the selected animated content is halted either immediately after making the determination or after allowing the animated content to execute for a period of time, such as a predetermined period of time, which will be typically a shortened period of time relative to the normal time that the animation would have run. Allowing the animation to run for a period of time allows the user to see whether the user is interested in the animated content. In certain embodiments, the method may optionally show the animation after it has been halted upon user or system request. This is shown as operation 209 of FIG. 2. The user may, for example, hover a cursor over the stopped or halted animation or may position an input device, such as a pointer or a finger, etc. over the animated content in order to provide the input to indicate that the user seeks to see the animation after it was halted.

Figure 3A:
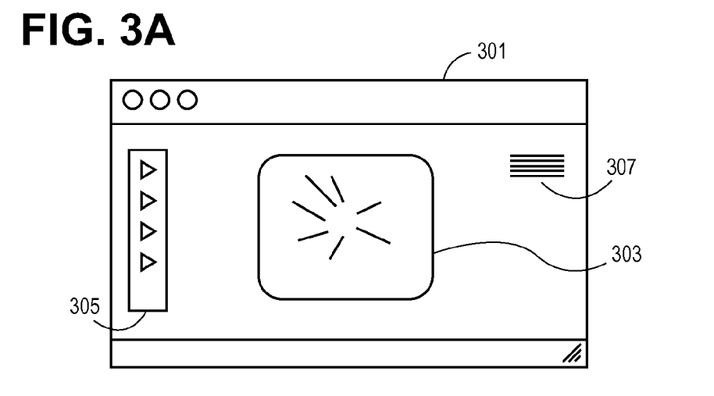
FIG. 3A shows an example of a page containing animated content.

FIGS. 3A, 3B, 3C, and 3D provide examples of rules which can be used to decide whether or not to stop prematurely any animated content. FIG. 3A shows an example of a window 301 which displays a page that contains text 307, a menu bar or navigation pane 305, and an animated content 303 which may be a movie (e.g. presented by a QuickTime plug-in or other video presentation plug-ins known in the art). The animated content 303 occupies a large and central portion of the page shown within window 301. In one embodiment, a rule can specify that if the animated content is positioned at the center of the page and occupies more than a certain amount (e.g. more than 25% to 35% of the area of the displayed page) then the animated content should not be stopped when the method is determining whether or not to halt or stop execution. In one embodiment, web browsers can determine the size of the window which displays the web page and can also determine the size of the rectangle of the plug-in or the animated content and can determine whether or not that animated content is located at the center of the page. Given this rule and the ability to make these determinations, the web browser can determine that the animated content should not be stopped. Hence, with this rule, a user who displays a web page showing videos, such as YouTube, etc. will be permitted to continue to observe the animated content without having the animated content halted prematurely (e.g. for a shortened duration) because in this case, the animated content is in the center of the page and occupies a significant portion of the web page.

Figure 3B:
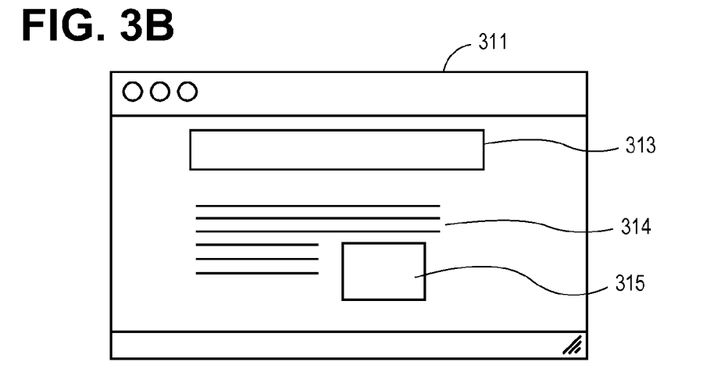
FIG. 3B is an example of another page containing animated content.

FIG. 3B shows an example of the use of two rules in deciding whether or not to stop animated content according to one embodiment. The page shown within the window 311 includes a banner ad 313 which includes animated content and a small animated content 315 and text 314. The small animated content 315 may be a video clip which is associated with a news story presented by the text 314, and the banner ad displayed in animated content 313 may be an advertisement which includes animated content that is displayed continuously and indefinitely. The animated content may include audio as well as a video/visual component. In one embodiment, a method according to the present invention determines the location of the animated content and the size of the animated content relative to the size of the web page and determines whether or not the content is wide and narrow at the top or the bottom or the sides of the window. In the case of the window 311, the animated content 313 is wide and narrow and at the top of the window, and as a result the rule dictates that the animated content should be halted either immediately after determining that it should be halted or after allowing the animated content to execute for a shortened duration. On the other hand, the small animated content 315 may be allowed to execute indefinitely if it is smaller than x pixels in width or height (e.g. where x can be, for example, 50 pixels). This rule allows certain animated content to execute because it is small enough that it may not adversely affect energy consumption in at least certain embodiments. Further, because the small animated content 315 is not at the top or the sides or the bottom of the page, it is permitted to run by the rule which halted the execution of animated content 313.

Figure 3C:
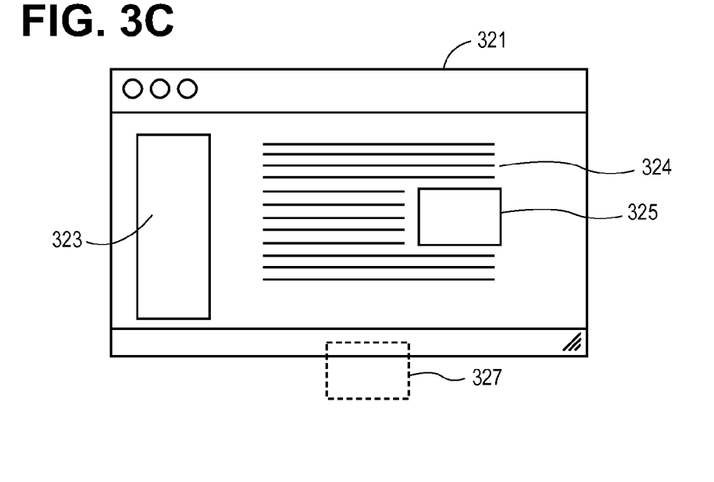
FIG. 3C is an example of a page, such as a web page, containing animated content.

In the example shown in FIG. 3C, the window 321 includes animated content 323 which is located along a side of the page shown in the window 321. This page also includes text 324 and animated content 325, which may be a video clip associated with the text 324. In this example, a heuristic or rule can decide to halt execution of the animated content 323 which appears to be a side ad or other animated content on the side of the page shown within the window 321. The animated content 325 can be permitted unrestricted execution in one embodiment either because it is sufficiently small as described in relation to animated content 315 or because it is not located at an edge of the page. Animated content 327 is also in the content of the page, however, it is not displayed within the window 321; in order to see the animated content 327, the user would need to scroll down or otherwise change the window 321 (e.g. resize the window) to allow the animated content 327 to be presented within the window 321. According to one rule, if the animated content, such as content presented by a plug-in, is not rendered onscreen, then the method of the present invention decides to not stop the animated content. This may be done in order to allow the user to see the animated content should the user scroll the window or resize the window, and this is also useful in those cases in which an animation cannot be restarted when a window is resized or scrolled by the user.

Figure 3D:
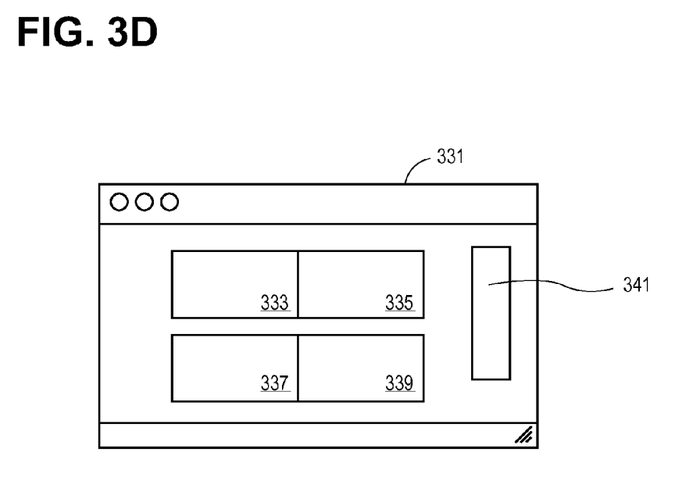
FIG. 3D is an example of a page, such as a web page, containing animated content.

Window 331 shown in FIG. 3D is an example of a page having multiple regions which include animated content. In this case, several of those regions are juxtaposed and there is a side animated content region 341 in addition to four other animated content regions 333, 335, 337, and 339. In one embodiment, a rule-based system can use a rule that states that if there are more than y (y=3, for example) or more animated content regions within a page, then the animated content on the page should not be halted because the page is designed to show a plurality of movies or could be a game or other types of web pages in which the animated content is critical to the user experience rather than being unnecessary or annoying animations; in other words, the animations would be considered useful animations, including the animated content 341 even though it is on the side of the page shown in the window 331.

It will be appreciated that there are numerous ways to structure the rules to accomplish various results. For example, any one of the rules could be used by itself without the use of any other rule or combinations of two or more rules could be used together (such as in the case of the window 311 of FIG. 3B). In one embodiment, the rules may be implemented according to the following pseudocode which describes a function that can be used at each node in a web page's content.

```
bool PluginHalterController::shouldHaltPluginNode(const SDOMNode& node, bool isWindowed, const
SString& pluginName) const
{
    if (m__webView.hasPluginForNodeBeenHalted(node))
        return false;
    if (!isPluginHaltable(node, isWindowed, pluginName))
        return false;
    CGRect boundingBox = SDOMElement::dynamicCast(node).boundingBox( );
    // In this example, very small or even invisible plug-ins are not halted for three reasons:
    // 1) It's atypical for small/invisible plug-ins to hog energy.
    // 2) Many are used for important interactions on the page (e.g. MobileMe WebMail and Facebook Chat).
    // 3) Our design is to restart plug-ins upon hover or otherwise select. Users can't hover or otherwise select
what they can't see.
    if (boundingBox.size.width < smallPluginWidth || boundingBox.size.height < smallPluginHeight)
        return false;
    // Plug-ins that are much taller than wide are less likely to be important.
    CGFloat pluginHeightToWidthRatio = boundingBox.size.height / boundingBox.size.width;
    if (pluginHeightToWidthRatio < allowedPluginHeightToWidthRatio)
        return true;
    // Plug-ins wider than smallPluginWidth but less wide than minimumPluginWidth are not
    // usually focal to a site design.
    if (boundingBox.size.width < minimumPluginWidth)
        return true;
    return false;
}
```

Figure 4:
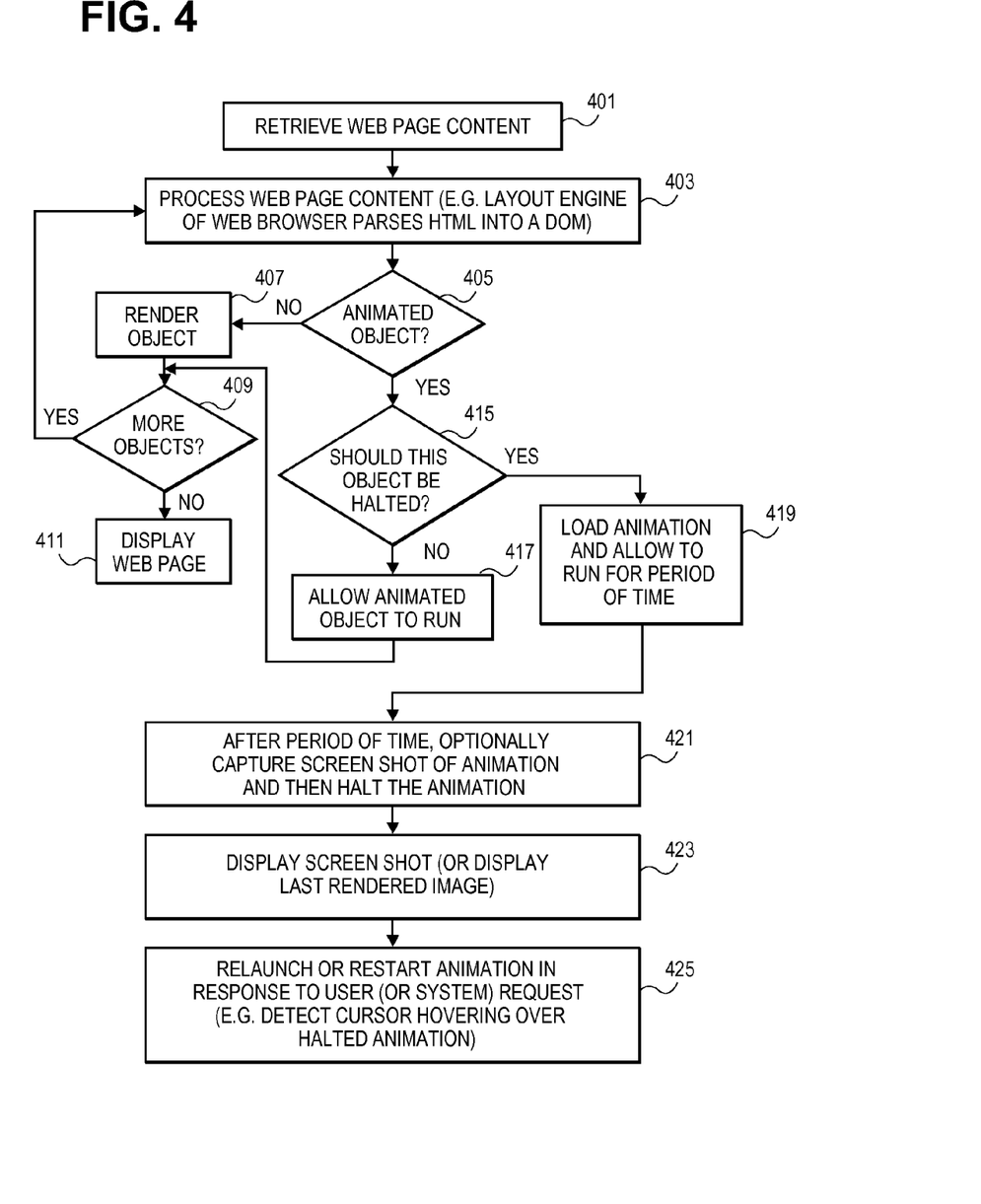
FIG. 4 is a flowchart showing a method according to one embodiment described herein.

FIG. 4 is a flowchart showing another example of an embodiment of a method according to the present invention. This method can process multiple animated objects and halt or stop certain animated objects or content while permitting other animated content to execute. This method can also display a screen shot captured from the animated content which can be displayed after the animated content has been halted in order to convey to the user the subject matter of the halted animated content (and hence allow the user to make a decision about whether or not to cause the animated content to be executed after it has been halted). In operation 401, the system receives or retrieves web page content. Then in operation 403, the web page content is processed; for example, a layout engine of a web browser parses the HTML of the web page into a DOM tree or data structure. Then in operation 405, the system determines whether or not a particular object is an animated object. If it is determined that it is not an animated object, then the object is rendered in operation 407 and the system determines, in operation 409, whether there are more objects to process. If there are more objects, then processing returns to operation 403, otherwise the entirety of the web page is displayed or a portion of the web page is displayed, depending upon the window given to the web page, in operation 411.

If in operation 405 it is determined that the object is animated, then the method determines in operation 415 whether or not execution of the object should be halted. If it is determined that it should not be halted, then processing proceeds to operation 417 in which the animated object is allowed to run and the method continues to operation 409 to see whether or not there are more objects to process. If in operation 415 it is determined that the object should be halted (e.g. based upon the rules or heuristics described herein), then in operation 419 the animation is loaded and allowed to run for a period of time. In alternative embodiments, operation 419 can be optional and the animation can be halted immediately upon determining that it should be halted in operation 415. In operation 421, the system optionally captures a screen shot of the animation after a period of time and then halts the animation. The captured screen shot can be used to display the halted animation and can also be used in conjunction with a user interface to allow the user to restart the animation or allow it to continue from the halted moment. The captured screen shot or last rendered image of, for example, an animated GIF can be displayed in operation 423, and this can allow a user to interact with the halted animation to cause it to restart or relaunch, which can occur in operation 425. The user request may be an input such as hovering of a cursor over the halted animation or the selection of a user interface element such as a play button displayed as a translucent overlay over the halted animation or other known user interface controls which may be displayed on or near the halted animation.

Figure 5:
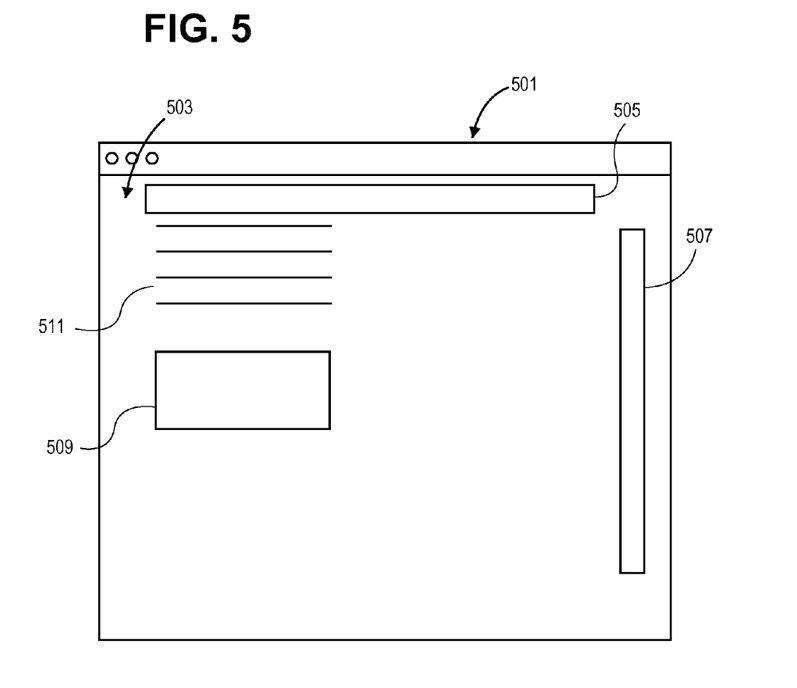
FIG. 5 shows an example of a page in which it has been determined to stop some of the animated content but not other animated content.
Figure 8:
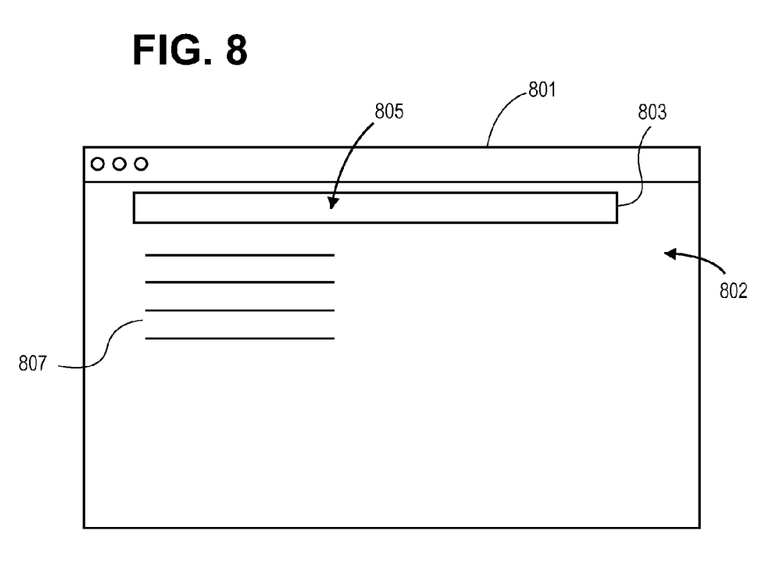
FIG. 8 shows an example of a user interface for allowing a user to interact with a halted animation.

FIG. 5 shows an example of a page within a window 501 which includes both halted animated content as well as animated content which is not halted. Hence, within the same page, the system has, for the rules described herein, decided to halt certain animated content while permitting other animated content to execute even if that animated content can execute continuously and indefinitely. In the example shown in FIG. 5, the page 503 includes a banner ad 505 and a side bar ad 507 both of which contain animated content that have been halted according to one or more embodiments of the present invention. The page 503 also includes text 511 and animated content 509 which may be a movie or other animated content. According to the rules described herein, an embodiment of the present invention has decided to not halt the execution of the animated content 509 while at the same time it has caused the halting of the animated content 505 and the animated content 507 because the heuristics or rules have decided that those animated contents are probably unnecessary or not useful because they are, for example, banner ads, side bar ads, etc. In one embodiment, the user interface will not show that an animation has been halted but a user can position a cursor or finger or other input mechanism near or over the animated content to cause the display of an indication that the animation was halted or to cause the display of a play control to allow the user to cause the animation to be relaunched or restarted. The play control or other control may be a translucent user interface element that is overlaid over the halted animated content at least in some embodiments. FIG. 8 shows a further example of how a command can be overlaid over an animated content that has been halted.

FIG. 8 shows an example of a user interface which allows a user to request that the system relaunch or restart an animation that has been halted according to one or more embodiments described herein. Window 801 shown in FIG. 8 displays all or a portion of page 802 which includes a banner ad 803 and text 807. The system has determined that the banner ad 803 should be halted by performing operation 205 or operation 415 as described above. After halting the animation, the system can display a play button 805 which is a form of a user interface element that a user can select to cause the animated content within the banner ad 803 to be relaunched or restarted. The play button 805 can be displayed as a translucent icon overlaid over the halted animation in the banner ad 803. The halted animation may include a screen shot of the halted animation which is displayed under the translucent play button 805. In addition or alternatively, words to indicate that the animation was halted can be displayed, and those words can indicate to the user how to restart or relaunch the animation (e.g. for example, "click here to restart this halted animation"). In another embodiment, the user interface will not show that an animation was halted as explained above, however the user can restart or relaunch the animation even in this case by positioning the cursor over a user interface element to restart all halted animations or by hovering the cursor over the halted animation or by other inputs such as placing a finger (on a touch screen input/display device) over the animated content which was halted, etc.

Figure 6:
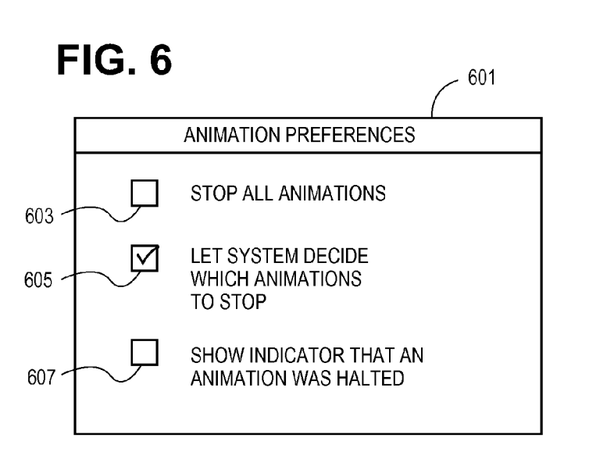
FIG. 6 is an example of a user interface which allows a user to set a preference with respect to how animations are handled.

FIG. 6 shows an example of a user interface which allows a user to control various aspects of the animation processing described herein. This user interface may involve a preference setting such as a preference setting within a web browser or a preference setting or other user setting control in a system control panel, etc. The preference window 601 includes three check boxes. Check box 603 and 605 are mutually exclusive such that if a user selects one (to cause the check to appear within it and thereby activate the feature) then the other is unchecked and not selected. Check box 603 allows a user to indicate to the system that all animations are to be stopped and that there is no need to make a determination, such as the determination in operation 205 or the determination in operation 415 of whether to halt an animation. If the user selects check box 605, then the user is allowing the system to decide which animations to stop or halt, in which case it will perform operations 415 or 205 described above. If the user selects the check box 607, the system will then display an indicator showing that an animation was halted. This may involve text displayed in a translucent manner and overlaid over the halted animation or may involve the display of a translucent user interface element, such as the play button 805.

Figure 7:
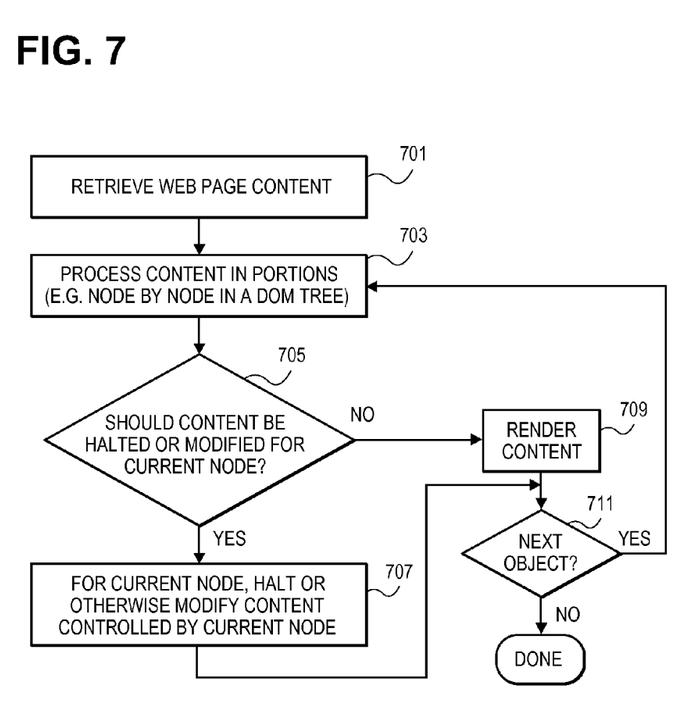
FIG. 7 is a flowchart depicting a method according to another embodiment described herein.

FIG. 7 shows a method according to another aspect of the present invention in which a page, such as a web page, is processed in a node-by-node manner and, during that processing, it is determined, on a node-by-node basis, whether or not to halt or modify content for a current node. A web page can be represented by data having a hierarchical content that includes separate portions that each specify separate corresponding sections of the web page. According to the method shown in FIG. 7, the web page can be processed on a node-by-node basis, such as in a DOM tree and it can be determined, on a node-by-node basis, whether to halt or modify content within a current node. The execution of a particular portion or content within a node can be restricted by, for example, halting the execution of the animated content after a period of time which is less than the normal display time of the animated content. In operation 701, the web page content or other content is retrieved, and then processed in operation 703. The processing can be performed on a node-by-node basis in a DOM tree by a parser within a web browser. Then in operation 705, it is determined whether the content within a particular node should be halted or otherwise modified. If not, it is rendered in operation 709 and processing determines, in operation 711, whether there is another object to continue processing. If not, the method is done and otherwise the method reverts back to operation 703. If in operation 705 it is determined for the current node to halt or otherwise modify the content controlled by the current node, then processing proceeds to operation 707 in which, for the current node, the system halts or otherwise modifies the content controlled by the current node. One example of this halting is the halting of the playing of animated content as described herein.

Figure 9:
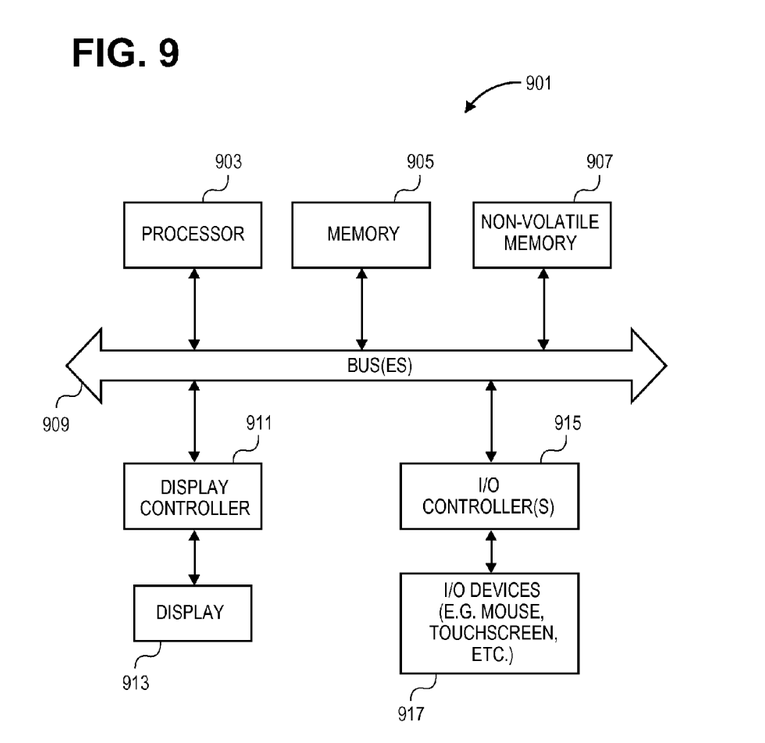
FIG. 9 shows an example of a system which may be used to implement any one or all of the embodiments described herein.

Any one of the methods described herein can be implemented on a variety of different data processing devices, including general purpose computer systems, special purpose computer systems, etc. For example, the data processing systems which may use any one of the methods described herein may include a desktop computer or a laptop computer or a tablet computer or a smart phone, or a cellular telephone, or a personal digital assistant (PDA), an embedded electronic device or a consumer electronic device. FIG. 9 shows one example of a typical data processing system which may be used with the present invention. Note that while FIG. 9 illustrates the various components of a data processing system, such as a computer system, it is not intended to represent any particular architecture or manner of interconnecting the components as such details are not germane to the present invention. It will also be appreciated that other types of data processing systems which have fewer components than shown or more components than shown in FIG. 9 may also be used with the present invention. The data processing system of FIG. 9 may be a Macintosh computer from Apple Inc. of Cupertino, Calif. As shown in FIG. 9, the data processing system 901 includes one or more buses 909 which serve to interconnect the various components of the system. One or more processors 903 are coupled to the one or more buses 909 as is known in the art. Memory 905 may be DRAM or other volatile memory or may be flash memory. This memory is coupled to the one or more buses 909 using techniques known in the art. The data processing system 901 can also include non-volatile memory 907 which may be a hard disk drive or a flash memory or a magnetic optical drive or magnetic memory or an optical drive or other types of memory systems which maintain data even after power is removed from the system. The non-volatile memory 907 and the memory 905 are both coupled to the one or more buses 909 using known interfaces and connection techniques. A display controller 911 is coupled to the one or more buses 909 in order to receive display data to be displayed on a display device 913 which can display any one of the user interface features or embodiments described herein. The display device 913 can include an integrated touch input to provide a touch screen. The data processing system 901 can also include one or more input/output (I/O) controllers 915 which provide interfaces for one or more I/O devices, such as one or more mice, touch screens, touch pads, joysticks, and other input devices including those known in the art. The input/output devices 917 are coupled through one or more I/O controllers 915 as is known in the art.

While FIG. 9 shows that the non-volatile memory 907 and the memory 905 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers. As is known in the art, the one or more buses 909 may include one or more bridges or controllers or adapters to interconnect between various buses. In one embodiment, the I/O controller 915 includes a USB adapter for controlling USB peripherals and can control an Ethernet port or a wireless transceiver or combination of wireless transceivers. It will be apparent from this description that aspects of the present invention may be embodied, at least in part, in software. That is, the techniques may be carried out in a data processing system in response to its processor executing a sequence of instructions contained in a memory such as the memory 905 or the non-volatile memory 907 or a combination of such memories which together may embody the machine readable storage medium 100 shown in FIG. 1. In various embodiments, hardwired circuitry may be used in combination with software instructions to implement the present invention. Thus the techniques are not limited to any specific combination of hardware circuitry and software nor to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory machine readable storage medium storing executable instructions which when executed cause a data processing system to perform a method comprising:
   receiving data representing content of a page;
   detecting, from the data, whether the page includes animated content, the detecting including parsing the data with a layout engine into a data structure having multiple nodes and detecting for each node of the data structure whether the node includes an animated object, wherein the animated object includes a call to a plug-in that renders animation;
   determining whether to halt execution of the animated content using a set of rules including a size of the animated content, wherein the determining includes allowing at least a portion of the animated content below a minimum size to be executed without halting while causing at least a portion of the animated content above the minimum size to be halted; and
   halting execution of the portion of the animated content determined to be halted, in response to determining to halt execution.

2. The medium as in claim 1 wherein the method further comprises:
   allowing execution of the portion of the animated content to be halted to present the portion of the animated content to be halted for a period of time and then halting execution of the portion of the animated content to be halted, and wherein the page is a web page.

3. The medium as in claim 2 wherein halting execution of the portion of the animated content is performed to conserve power.

4. The medium as in claim 1 wherein the set of rules additionally includes rules based upon the size of an area displaying the page and a location of the animated content in the page.

5. The medium as in claim 1 wherein allowing the execution of the portion of the animated content allowed to execute occurs after determining whether to halt execution and before halting the execution of the portion of the animated content determined to be halted.

6. The medium as in claim 5 wherein detecting, from the data, whether the page includes animated content comprises:
   parsing the data with the layout engine into a document object model data structure.

7. The medium as in claim 5, the method further comprising:
   capturing and displaying an image of the animated content before halting execution; and
   detecting an input and in response to the input allowing, after halting execution, execution of some of the animated content to present some of the animated content.

8. A machine implemented method comprising:
   receiving data representing content of a page;
   detecting, from the data, whether the page includes animated content, the detecting including parsing the data with a layout engine into a data structure having multiple nodes and detecting for each node of the data structure whether the node includes an animated object, wherein the animated object includes a call to a plug-in that renders animation;
   determining whether to halt execution of the animated content using a set of rules including a size of the animated content, wherein the determining includes allowing at least a portion of the animated content below a minimum size to be executed without halting while causing at least a portion of the animated content above the minimum size to be halted; and
   halting execution of the portion of the animated content determined to be halted, in response to determining to halt execution.

9. The method as in claim 8 wherein the method further comprises:
   allowing execution of the portion of the animated content to be halted to present the portion of the animated content to be halted for a period of time and then halting execution of the portion of the animated content to be halted, and wherein the page is a web page.

10. The method as in claim 9 wherein halting execution of the portion of the animated content is performed to conserve power.

11. The method as in claim 8 wherein the set of rules additionally includes rules based upon the size of an area displaying the page and a location of the animated content in the page.

12. The method as in claim 8 wherein the allowing of execution of some of the animated content occurs after the determining whether to halt execution and before the halting of execution of the portion of the animated content determined to be halted.

13. The method as in claim 12 wherein detecting whether the page includes animated content comprises:
   parsing the data with the layout engine into a document object model data structure.

14. The method as in claim 12, the method further comprising:
   capturing and displaying an image of the animated content before halting execution; and
   detecting an input and in response to the input allowing, after halting execution, execution of some of the animated content to present some of the animated content.

15. A data processing system comprising:
   means for receiving data representing content of a page, the means for receiving comprising a network interface;
   means for detecting, from the data, whether the page includes animated content, the means for detecting comprising one or more processors, the detecting including parsing the data with a layout engine into a data structure having multiple nodes and detecting for each node of the data structure whether the node includes an animated object, wherein the animated object includes a call to a plug-in that renders animation;
   means for determining whether to halt execution of the animated content, wherein the determining includes allowing at least a portion of the animated content below a minimum size to be executed without halting while causing at least a portion of the animated content above the minimum size to be halted; and
   means for halting execution of the portion of the animated content in response to determining to halt execution.

\* \* \* \* \*